United States Patent [19]

Neuroth

[11] Patent Number: 4,641,187
[45] Date of Patent: Feb. 3, 1987

[54] METHOD FOR INCREASING CONTRAST BETWEEN AN OBJECT AND SPACE WHEN PHOTOGRAPHING SUCH AN OBJECT WITH A TELEVISION CAMERA

[75] Inventor: Norbert Neuroth, Mainz, Fed. Rep. of Germany

[73] Assignee: Schott Glaswerke, Mainz, Fed. Rep. of Germany

[21] Appl. No.: 694,183

[22] Filed: Jan. 23, 1985

[30] Foreign Application Priority Data

Jan. 23, 1984 [DE] Fed. Rep. of Germany ....... 3402132

[51] Int. Cl.$^4$ .......................... H04N 7/18; H04N 5/30
[52] U.S. Cl. ..................... 358/106; 358/110; 356/237; 356/240; 250/223 B; 250/358.1; 350/1.1
[58] Field of Search ................ 358/106, 110, 113; 56/51, 237, 240; 250/372, 358.1, 223 B; 350/1.1

[56] References Cited

U.S. PATENT DOCUMENTS

| 3,529,169 | 9/1970 | Heaney et al. | 250/223 B |
| 4,026,656 | 5/1977 | Kusz et al. | 358/106 |
| 4,459,487 | 7/1984 | Leser | 250/223 B |
| 4,539,588 | 9/1985 | Ariessohn et al. | 358/113 |

Primary Examiner—James J. Groody
Assistant Examiner—John K. Peng
Attorney, Agent, or Firm—Millen & White

[57] ABSTRACT

A method of increasing the contrast when photographing a transparent object, such as a glass object through the use of a television camera, is provided. The transparent object is illuminated with radiation in a region of the spectrum to which the transparent object is impermeable. A filter which suppresses the radiation in the region of the spectrum to which the transparent object is permeable and transmits radiation in the region of the spectrum to which the transparent object is impermeable is used between the light source and the transparent object. An electronic pick-up camera which is sensitive, i.e., capable of detecting radiation, in the region of the spectrum to which the filter is permeable, is used for taking photographs of the object. In contrast to known processes in which the transparent objects appear dark only at certain edge regions or other points of marked curvature, an object which appears transparent to the eye is thus represented in completely opaque fashion, in accordance with this method, so that the geometric dimensions of the transparent object can be determined automatically and can be compared with a prototype during, for example, an operation of manufacture of the transparent objects. The invention also relates to the apparatus for conducting this method.

20 Claims, 2 Drawing Figures

METHOD FOR INCREASING CONTRAST BETWEEN AN OBJECT AND SPACE WHEN PHOTOGRAPHING SUCH AN OBJECT WITH A TELEVISION CAMERA

BACKGROUND OF THE INVENTION

This invention relates to a method and apparatus for increasing contrast between an object and space to determine the contours of the object when photographing a transparent object with a television camera.

It is well known to use television cameras to automatically measure the contour of a variety of opaque objects in various manufcturing industries. Typically, such an object will be illuminated from behind the image will be photographed by a television camera. The resultant image is then stored and compared to a reference image. If the deviation between the manufactured object and the reference image is greater than a predetermined tolerance, then necessary adjustments are made in the manufacturing equipment and the faulty object sorted out or discarded. These systems are conventional and well known to those of ordinary skill in the art, see for instance K. Melchior and G. Pavel "Automatisieren von Prüfvorgängen mit bildverarbeitenden Sensoren", Technisches Messen, 50, 1983, p. 185-190 and 225-231.

Typically, this method works very well and accurately when the objects being scanned or photographed by the television camera are completely or substantially completely opaque, such as metal objects, since the boundary between transmitted light region and non-transmitted light is readily apparent. However, a problem arises during automatic measurement of the contour of transparent objects such as glass objects because the glass objects appear dark only at specific edge regions or at other points of marked curvature due to the transparency of the glass. It is therefore difficult or impossible, with conventional cameras operating in the visible and near infrared region of the spectrum, to determine the contour of the glass object automatically by conventional line scanning techniques. This presents serious problems because it is important to determine the contour of these objects so that the geometric dimensions of the glass objects can be determined automatically and compared with a prototype during manufacture of the glass objects or for establishing the position of a glass object relative to the border of the image. This determination of the relative position forms the basis for automatic image recognition for controlling manufacturing robots involved in the manufacturing process.

It is important to note that the term "transparent" as used above and hereinafter when referring to an object scanned or photographed is intended to mean capable of permitting passage of radiation or particles, but not necessarily permitting passage of all radiation and particles. Thus, a "transparent" medium or object in this case is one which has the property of transmitting rays of light or other electromagnetic radiation in a way that the human eye may see through the medium distinctly but which does not transmit all light wavelengths or electromagnetic radiation. One example is oxide glass normally used in industry which is transparent only to electromagnetic radiation having a wavelength of about 350 nm-4.5 $\mu$m.

SUMMARY OF THE INVENTION

It is thus an object of the present invention to provide a method of making an object which appears transparent to the eye appear black when photographed with a television camera.

It is another object of the invention to provide a method of determining the contours of a transparent object by photographic means in an accurate and simple manner.

Still another object is to provide a device for achieving the above objects.

Upon further study of the specification and appended claims, further objects and advantages of this invention will become apparent to those skilled in the art.

In accordance with the method of the invention a transparent object is photographed with a television camera, i.e., an electronic pick up camera. This camera has a lense which generates an image on a photosensitive layer, which is scanned by an electron beam. The electrical signals are fed into a monitor.

The object to be photographed is illuminated, with radiation, i.e., electromagnetic radiation in the region of the spectrum to which the object is impermeable, i.e., does not permit the specific wavelengths radiation to pass therethrough. In the method, an optical filter of the type capable of suppressing radiation in the region of the spectrum to which the object is permeable and transmitting radiation in the region of the spectrum to which the object is impermeable is used. The optical filter can be colored glass or an interference filter which are commercially available.

The filter is positioned between the light source illuminating i.e., backlighting, the object and the object itself. On the other side of the object a television camera, i.e., an electronic pick-up camera, of the type sensitive in the region of the spectrum to which the filter is permeable, is used to take photographs of the object to thereby determine precisely its contour and/or position, for example, for use in a manufacturing process.

In a more specific aspect the method comprises irradiating the object with ultraviolet radiation to which the transparent object is impermeable. In this aspect the optical filter employed is one which transmits this ultraviolet, i.e., UV, radiation but suppresses the visible and short-wave infrared radiation. The camera used in this case is one which is sensitive, i.e., capable of picking up radiation, in the region of the UV spectrum used. In still another aspect the radiation used is medium wave infrared radiation, i.e. 5-50 microns. In this case the equipment used is of the type adapted for use in the medium wave infrared radiation range. These devices are conventional and well known to those of ordinary skill in the art.

In still another aspect the method invention also contemplates using another filter in front of the camera between the object and the camera to suppress reflected or scattered daylight radiation directed toward the camera. Such a filter is conventional. The invention also relates to the apparatus employed for conducting the method.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION OF THE INVENTION

In a more specific aspect the invention is directed to the photographing, for contour determining purposes, of oxide glasses. For information about oxide glasses, see W. D. Kingery, H. K. Bowen and D. R. Uhlmann "Introduction to Ceramics", J. Wiley and Sons, New York.

Figure 1:
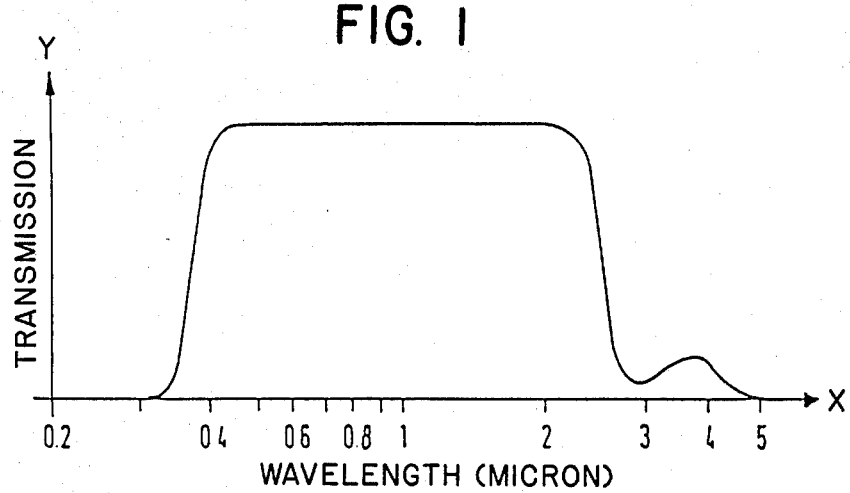
FIG. 1 is graph illustrating the region of the electromagnetic spectrum of tyical light transmission of oxide glass in a layer thickness of about 10 mm.

As shown in FIG. 1, oxide glasses which are typically used in industry are transparent to electromagnetic radiation in the wavelength range of about 350 nm-4.5 $\mu$m. The above-discussed problems in photographing for contour determining purposes therefore arise when using television cameras which operate in the wavelength range to which the oxide glasses are transparent.

Figure 2:
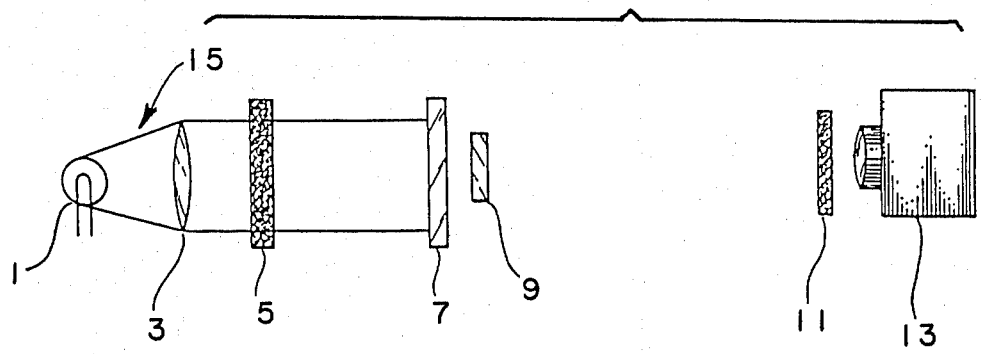
FIG. 2 shows an arrangement of devices of the invention used for conducting the inventive method in photographing transparent objects while maintaining a high degree of contrast.

One solution to the above discussed problem, as shown in FIG. 2, involves the use of UV radiation to illuminate, i.e., backlight, the oxide glasses being photographed. A ground glass disc 7 is exposed with a high-pressure mercury lamp 1 having strong emission lines in the range of from about 280–365 nm, (and also in the visible range). The visible portion of the mercury lamp 1 radiation 15 is suppressed by an optical filter 5 and the UV portion with wavelengths of less than 350 nm is transmitted (path of rays 15 shown in FIG. 2). The glass object 9 to be tested is placed behind the ground glass disc 7. The object 9 does not transmit any of the incident radiation impinging thereon. The television camera 13 directed towards the glass object 9 is sensitive in the ultraviolet region of the spectrum. An optical filter 11 which only transmits radiation with wavelengths of less than 350 nm but does not transmit radiation having longer wavelengths is located in front of the television camera 13. This ensures that the television camera 13 does not receive any (reflected or scattered) daylight. The glass object 9 now appears dark throughout on an image monitor, (not shown), just as a completely opaque, i.e., metal part, would. To ensure that the light 15 from the lamp 1 is properly directed, a lens 3 is used to direct it in parallel rays toward the filter 5 object 9 arrangement.

Another method involves the use of medium-wave infrared radiation (for example, radiation with wavelengths exceeding 4.5 $\mu$m till 50 $\mu$m).

The path of the rays 15 in this alternative method is the same as before, but the lamp 1 is infrared emitter instead of the mercury lamp previously used. The filter 5 is an IR filter instead of the UV filter, i.e., an IR filter which transmits the medium wave infrared radiation but suppresses radiation with a shorter wavelength, transmission in the far IR-region is not necessary. The glass object 9 thus also appears quite opaque on the monitor.

The resultant image can now be stored electronically and can be compared with the image of a different glass object. It is thus possible to compare the contour of transparent objects with each other automatically, (i.e., electronically). If the permitted deviations from the desired geometry are determined electronically, the transparent objects can be sorted automatically.

In addition to the above, this photographic technique can also be employed, for example, in the recognition of the relative position of a transparent object and therefore for the control of a robot used in a manufacturing process.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of increasing the contrast between an object and space when photographing a transparent object, the method comprising: with a radiation source, illuminating a transparent object with radiation in a region of the spectrum having wavelengths to which the transparent object is impermeable; filtering said radiation before impinging on said transparent object to block radiation having wavelengths to which said transparent object is permeable and to pass radiation having wavelengths to which said transparent object is impermeable; and, with a camera, photographing said object from the side of the object opposite the radiation source thereby obtaining a contour image of said object, said camera being capable of detecting radiation in the wavelength region being transmitted from the filtering step.

2. A method as in claim 1, wherein said filtering is conducted with a filter capable of transmitting radiation to which said object is impermeable and of blocking out radiation to which said object is permeable.

3. A method as in claim 1, wherein the object being photographed is made of optical glass, and said filtering comprises blocking out radiation of a wavelength of about 350 nm-4.5 $\mu$m.

4. A method according to claim 1 wherein said camera is a television camera.

5. A method as in claim 1 further comprising a second filtering step of filtering radiation before being detected by said camera for blocking any reflected or scattered daylight radiation transmitted to the camera.

6. A method according to claim 5 wherein said camera is a television camera.

7. A method as in claim 1 wherein the object being photographed is made of oxide glass.

8. A method according to claim 7 wherein said camera is a television camera.

9. A method as in claim 1, wherein said object is illuminated with ultraviolet radiation of wavelengths to which the transparent object is impermeable, said filtering being conducted to pass said ulraviolet radiation to which said object is impermeable and to block radiation in the visible and short-wave infrared wavelength range, and photographing said object with a camera which is capable of detecting radiation in the wavelength range being transmitted from said filtering step.

10. A method as in claim 9, wherein said filtering is conducted with a filter capable of transmitting radiation to which said object is impermeable and of blocking out radiation to which said object is permeable.

11. A method as in claim 9 wherein the object being photographed is made of oxide glass.

12. A method according to claim 9 wherein said camera is a television camera.

13. A method as in claim 9 further comprising a second filtering step of filtering radiation before being detected by said camera for blocking any reflected or scattered daylight radiation transmitted to the camera.

14. A method as in claim 13 wherein the object being photographed is made of oxide glass.

15. A method as in claim 1, wherein said object is illuminated with medium wavelength infrared radiation to which said object is impermeable, and said filtering being conducted to transmit said medium wavelength infrared radiation and suppress any radiation of shorter wavelengths, and photographing said object with camera which is capable of detecting radiation in the medium wavelength infrared range.

16. A method as in claim 15 wherein said filtering is conducted with a filter capable of transmitting radiation to which said object is impermeable and of blocking out radiation to which said object is permeable.

17. A method as in claim 15 wherein the object being photographed is made of oxide glass.

18. A method according to claim 15 wherein said camera is a television camera.

19. A method as in claim 15 further comprising a second filtering step of filtering radiation before being detected by said camera for blocking any reflected or scattered daylight radiation transmitted to the camera.

20. A method as in claim 19 wherein the object being photographed is made of oxide glass.

* * * * *